United States Patent [19]

Schneider

[11] Patent Number: 6,072,506
[45] Date of Patent: *Jun. 6, 2000

[54] METHOD AND APPARATUS FOR IMPROVED GRAPHICS PICKING USING AUXILIARY BUFFER INFORMATION

[75] Inventor: Bengt-Olaf Schneider, Ossining, N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,437

[22] Filed: May 8, 1997

Related U.S. Application Data

[62] Division of application No. 08/390,324, Feb. 17, 1995.

[51] Int. Cl.[7] ................................................ G09G 05/36
[52] U.S. Cl. .......................... 345/509; 345/435; 345/145; 345/514
[58] Field of Search .................................... 345/445, 145, 345/435, 501, 419, 433, 434, 507, 509, 514

[56] References Cited

U.S. PATENT DOCUMENTS 5,371,514  12/1994  Lawless et al. ......................... 345/435

Primary Examiner—Kee M. Tung
Attorney, Agent, or Firm—Jay P. Sbrollini

[57] ABSTRACT

Objects of a scene are grouped into sets. When rendering a plurality of pixels for display, for each pixel, a set identifier that corresponds to the visible object at the pixel is stored in an auxiliary buffer The information stored in the auxiliary buffer is utilized during picking in order to avoid the intensive task of traversing all of the objects of the scene to determine those objects intersected by the picking aperture.

9 Claims, 10 Drawing Sheets

METHOD AND APPARATUS FOR IMPROVED GRAPHICS PICKING USING AUXILIARY BUFFER INFORMATION

This Appln. is a Div of Ser. No. 08/390,324 filed Feb. 17, 1995.

BACKGROUND OF THE INVENTION

1. Technical Field

The invention relates generally to computer graphics systems, and, more particularly, to a method and apparatus for generating pick information in computer graphics systems.

2. Description of the Related Art

An essential part of interactive graphics systems is a picking operation in which a user identifies one or more objects of a three dimensional scene for subsequent processing. Typically, the user uses a pointing device such as a mouse or light pen to position a cursor or picking window over a portion of the three dimensional scene and to make the desired selection.

Picking is described in such references as U.S. Pat. No. 4,847,605 to Callahan et al.; U.S. Pat. No. 4,870,599 to Hempel et al.; U.S. Pat. No. 5,255,359 to Ebbers et al.; and U.S. Pat. No. 5,373,514 to Lawless et al., all assigned to the assignee of the present invention.

Picking typically is performed by defining a picking aperture and traversing all the primitives of the three dimensional scene to determine those primitives that are intersected by the picking aperture. The user then may select one of the intersecting primitives as the picked object. In the alternative, the intersecting primitives may be depth sorted using conventional z-buffer techniques and the front most primitive selected as the picked object.

In a detailed three dimensional scene, traversing all of the primitives to determine those primitives intersected by the picking aperture may be very intensive, and thus make the picking operation slow.

SUMMARY OF THE INVENTION

The above-stated problems and related problems of the prior art are solved with the principles of the present invention, method and apparatus for improved graphics picking using auxiliary buffer information. The method of the present invention is utilized in a graphics system, wherein objects defining a three dimensional scene are rendered for display as an array of pixels in a display area of a display device, to identify one or more objects that are visible within a picking aperture within the display area. The method comprises the steps of: in a normal operation mode, assigning each of the objects defining the scene with an identifier, determining which particular object of the objects defining the scene is visible for a given pixel of the display device, and storing the identifier assigned to the particular object in an auxiliary buffer at an address corresponding to the given pixel; and in a picking mode, defining the picking aperture within the display area, and for each pixel associated with the picking aperture, reading the identifier stored in the auxiliary buffer at an address corresponding to the pixel to thereby identify one or more objects visible in the picking aperture as a picked object.

The corresponding apparatus of the present invention is utilized in a graphics system, wherein objects defining a three dimensional scene are rendered for display as an array of pixels in a display area of a display device, to identify one or more objects that are visible within a picking aperture within the display area. The apparatus includes a system control processor, under control of an application program, that in normal operation mode assigns each of the objects defining the scene with an identifier; and a rasterizer, coupled to the system control processor via a system bus, that in normal operation mode determines which particular object of the objects defining the scene is visible for a given pixel of the display device, and a memory controller, coupled to the rasterizer, that in normal operation mode stores the identifier assigned to the particular object in an auxiliary buffer at an address corresponding to the given pixel; wherein the system control processor, under control of the application program, enters a picking mode whereby the picking aperture within the display area is defined according to user input; and wherein the memory controller, under control of the system control processor, enters the picking mode whereby, for each pixel associated with the picking aperture, the identifier stored in the auxiliary buffer at an address corresponding to the pixel is retrieved and transferred to the system control processor to thereby identify one or more objects visible in the picking aperture as a picked object.

By grouping the objects into sets, storing the set identifier of the visible object for each pixel in the auxiliary buffer during normal operation mode, and utilizing the information stored in the auxiliary buffer during picking mode, the picking operation of the present invention is an improvement over the conventional picking techniques because the present invention avoids the intensive task of traversing all of the objects of the scene to determine those objects intersected by the picking aperture.

Moreover, the auxiliary buffer that stores the set identification information may be integrated into a portion of the frame buffer that exists in current graphics workstations, but is not being utilized. Thus, advantageously, the present invention can be incorporated in the current architecture of graphics workstations with ease.

DETAILED DESCRIPTION OF THE PREFERRED EMBODIMENTS

Figure 1:
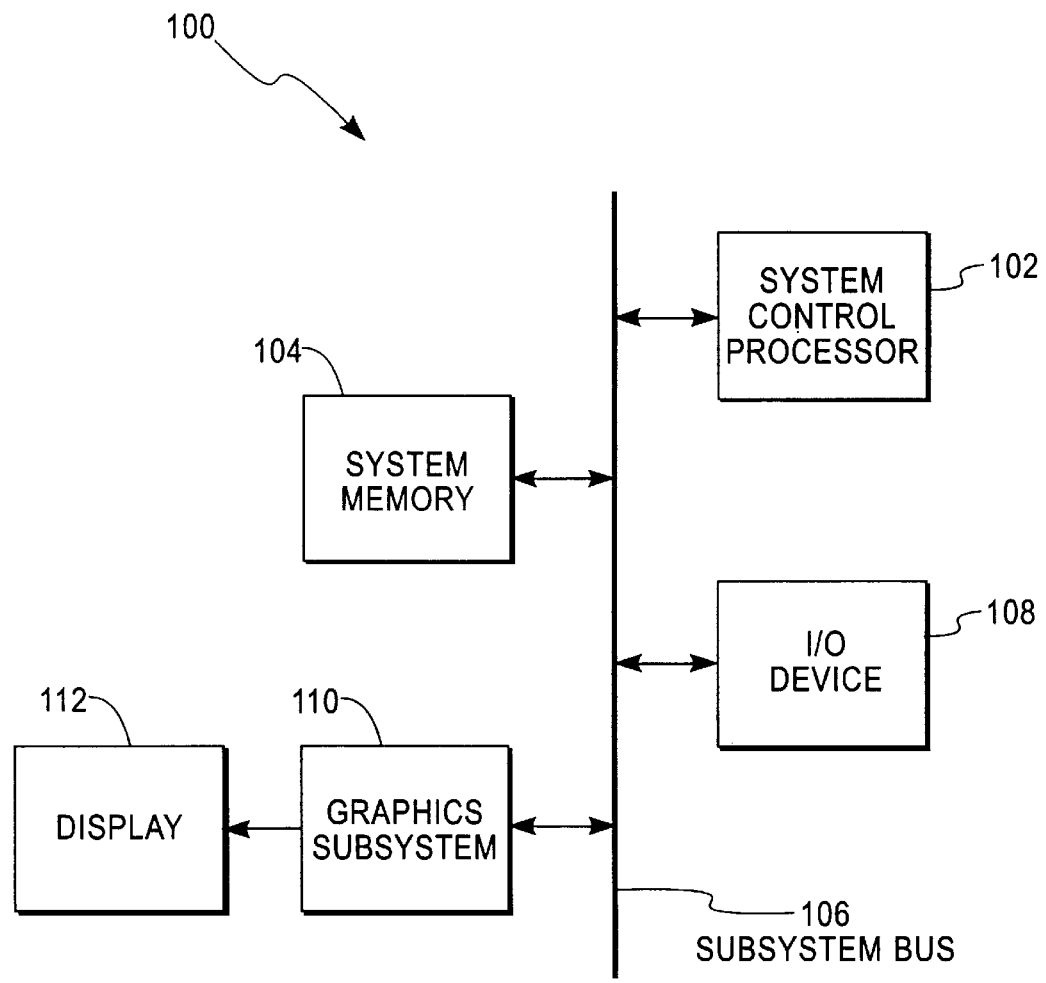
FIG. 1 is functional block diagram of a graphics workstation.

The overall architecture of the present invention is depicted in FIG. 1. As shown, a graphics system 100 includes a system control processor 102 which is coupled to a system memory 104 via a system bus 106. The system memory 104 consists of random access memory that stores graphics data defining the objects contained in one or more three dimensional models. The graphics data that defines each object consists of coordinates and attributes (e.g. color) of primitives. The primitives are geometric entities such as a solid, line or surface. Typically, the primitives are triangles defined by three vertices. In this case, the system memory 104 includes an ordered list of vertices of triangles that define the surfaces of objects that make up a three dimensional scene. In addition, the system memory 104 may store a list of primitive identifiers that correspond to each of the primitives and transformation matrices that specify how and where the primitives are to be displayed. Input/output (I/O) devices 108 interface to the system control processor 102 via the system bus 106. The I/O devices 108 may include a keyboard, template or touch pad for text entry, a pointing device such as a mouse, trackball, Spaceball or light pen for user input, and speech recognition for speech input.

The graphics system 100 also includes a graphics subsystem 110 that interfaces to the system memory 104 via the system bus 106. Generally, the graphics subsystem 110 operates to render the graphics data stored in the system memory 104 for display as an array of pixels in a display area of a display device 112. The display device 112 may utilize raster scan techniques or liquid crystal display techniques to display the pixels.

The graphics subsystem 110 of the present invention as described below may be implemented in hardware as, for example, a gate array or a chip set that includes at least one programmable sequencer, memory, integer processing unit (s) and floating point unit(s), if needed. In addition, the graphics subsystem 110 may include a parallel and/or pipelined architecture as shown in U.S. Pat. No. 4,876,644, commonly assigned to the assignee of the present invention and herein incorporated by reference in its entirety. In the alternative, the graphics subsystem 110 may be implemented in software together with a processor. The processor may be a conventional general purpose processor, a part of the host processor 102, or part of a co-processor integrated with the host processor 102.

Figure 2:
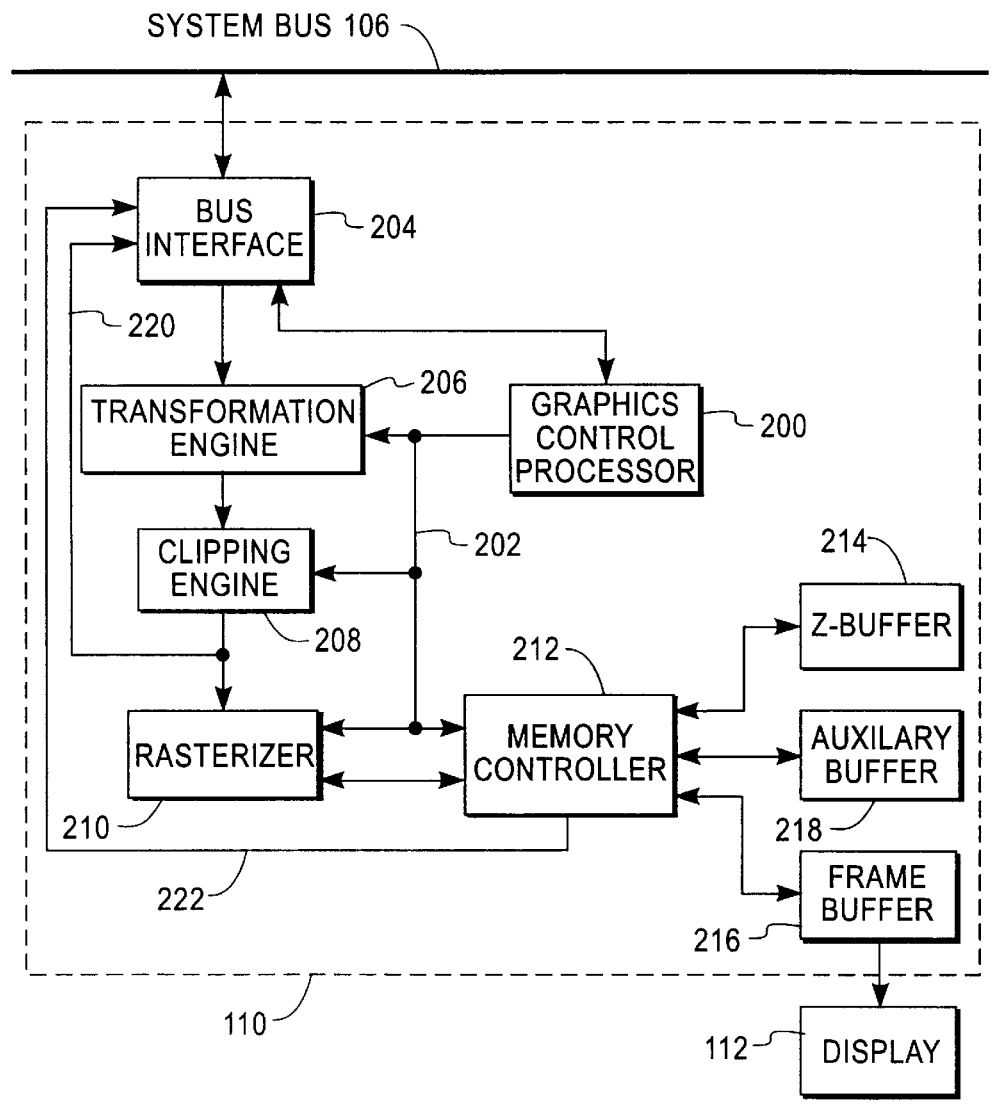
FIG. 2 is a functional block diagram of a graphics subsystem of the graphics workstation of FIG. 1.

More specifically, as shown in FIG. 2, the graphics subsystem 110 includes a graphics control processor 200 that supervises the operation of the graphics subsystem 110. The graphics control processor 200 controls the operations performed by the other elements of the graphics subsystem 110 via a control bus 202. The graphics subsystem 110 attaches to the system bus 106 via the bus interface 204, which reads and writes data from and to the system bus 106 by performing the communication protocol of the system bus 106.

A rendering pipeline that includes a transformation engine 206, a clipping engine 208, a rasterizer 210, a memory controller 212, Z-buffer 214 and frame buffer 216 is coupled to the bus interface 204. Z-buffer 214 typically contains sufficient memory to store a depth value for each pixel of the display 112. Conventionally, the depth value is stored as a 24-bit integer for each pixel. Frame buffer 216 typically contains sufficient memory to store color data for each pixel of the display 112. Conventionally, the color data consists of three 8-bit integers representing red, green and blue (r,g,b) colors for each pixel. A more detailed description of the Z-buffer 214 and frame buffer 216 is discussed below.

The transformation engine 206 transforms the graphics data from the intrinsic coordinate system of the model as stored in the system memory 104 into a normalized device coordinate system. In the case where the graphics data consists of vertices of triangles, the transformation engine 206 outputs the vertices of the triangles in the normalized device coordinate system. A more detailed description of the operation of the transformation engine 208 may be found in Foley, Van Dam, Feiner and Hughes, Computer Graphics Principles and Practice, pp. 201–281 (2nd Ed. 1990), herein incorporated by reference in its entirety.

The clipping engine 208 clips the transformed primitives against a clipping volume to define the portions of the transformed primitives that are potentially visible. The result of this step in the rendering pipeline is a list of vertices in the normalized device coordinate system that describe potentially visible portions of the primitives. A more detailed description of the operation of the clipping engine 208 may be found in Foley, Van Dam, Feiner and Hughes, Computer Graphics Principles and Practice, pp. 124–127 (2nd Ed. 1990), herein incorporated by reference in its entirety.

The rasterizer 210 decomposes the potentially visible portion of the primitives into individual pixels. For each pixel covered by a potentially visible portion of a primitive, the rasterizer 210 produces pixel information, e.g. color and depth of the primitive. A more detailed description of the operation of the rasterizer 210 in determining the pixel information may be found in Foley, Van Dam, Feiner and Hughes, Computer Graphics Principles and Practice, pp. 882–907 (2nd Ed. 1990) and U.S. Pat. No. 4,805,116 to B. C. Liang et al., which is commonly assigned to the assignee of the present invention, both herein incorporated by reference in their entirety.

For the purpose of this disclosure it will be assumed that decreasing pixel depth values represent positions closer to the viewer (as represented by the viewpoint), although the opposite convention may be used if desired. Initially, all pixel locations in the Z-buffer 214 are set to the largest value representable with the bits available for storing z-values. For each pixel covered by a potentially visible portion of a primitive, the memory controller 212 compares the depth value of the primitive to the depth value currently stored in the Z-buffer 214. If, at that pixel, the depth value of the primitive is smaller than the depth value currently stored in the Z-buffer 214, the Z-buffer 214 is updated with the depth value of the primitive, and the color value and supplemental information are stored in the frame buffer 216. When the rendering is complete, the color values at each pixel are read from the frame buffer 216 for display on the display device 112.

The results produced by the clipping engine 208 can be fed back to the system control processor 102 via the feedback bus 220 that connects to the bus interface 204.

The contents of the frame buffer 216 can read back and transferred to the system control processor 102 via the memory controller 212, feedback bus 222 and bus interface 204.

Figure 3:
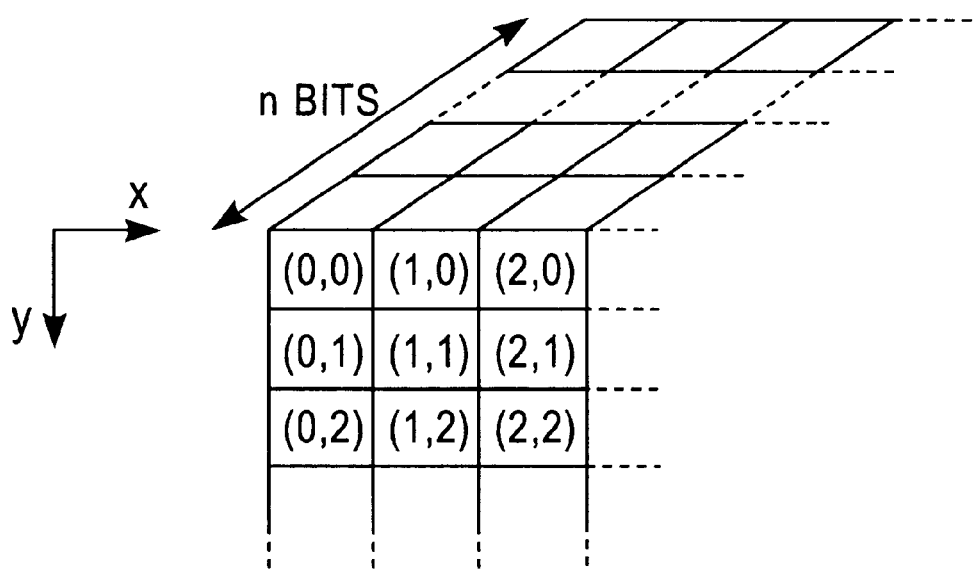
FIG. 3 is a pictorial representation of the conventional organization of, for example, a frame buffer or Z-buffer, or an auxiliary buffer for storing object identifiers according to the present invention.

The Z-buffer 214 and frame buffer 216 are organized to store several bits for each pixel on the display device 112. As shown in FIG. 3, as is conventional, the Z-buffer 214 and frame buffer 216 are arranged in a matrix of rows and columns each n bits deep. The particular row and column address corresponds to the pixel location on the display device 112. For example, the (row,column) address of (0,1)

may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in the Z-buffer 214 represent the depth of the object visible at that pixel. In addition, the grpahics subsystem 110 may include two frame buffers 216. As in conventional, one of the frame buffers serves as the active display portion, while the other frame buffer is updated for subsequent display. Either frame buffer may change from being active to inactive in accordance with the needs of the system 100; the particular manner in which the changeover is accomplished is not relevant to the present invention.

According to the present invention, an application program running on the system control processor 102 partitions the objects of a scene or group of scenes as stored in the system memory 104 into a plurality of sets, wherein each set is identified by a unique set identifier. Generally, during rendering, the set identifier corresponding to the object visible at a given pixel is stored in an auxiliary buffer 218 and utilized by the graphics subsystem 110 during the picking operation to efficiently identify the picked object.

More specifically, the application program may partition the objects of a scene or group of scenes into Q sets. The maximum size of Q depends on the number of bits per pixel available in the auxiliary buffer 218. If there are R bits per pixel available in the auxiliary buffer 218, Q must be chosen to be smaller than $2^{}R$. The sets may be numbered from 0 to $(2^{}R)-1$.

Figure 5:
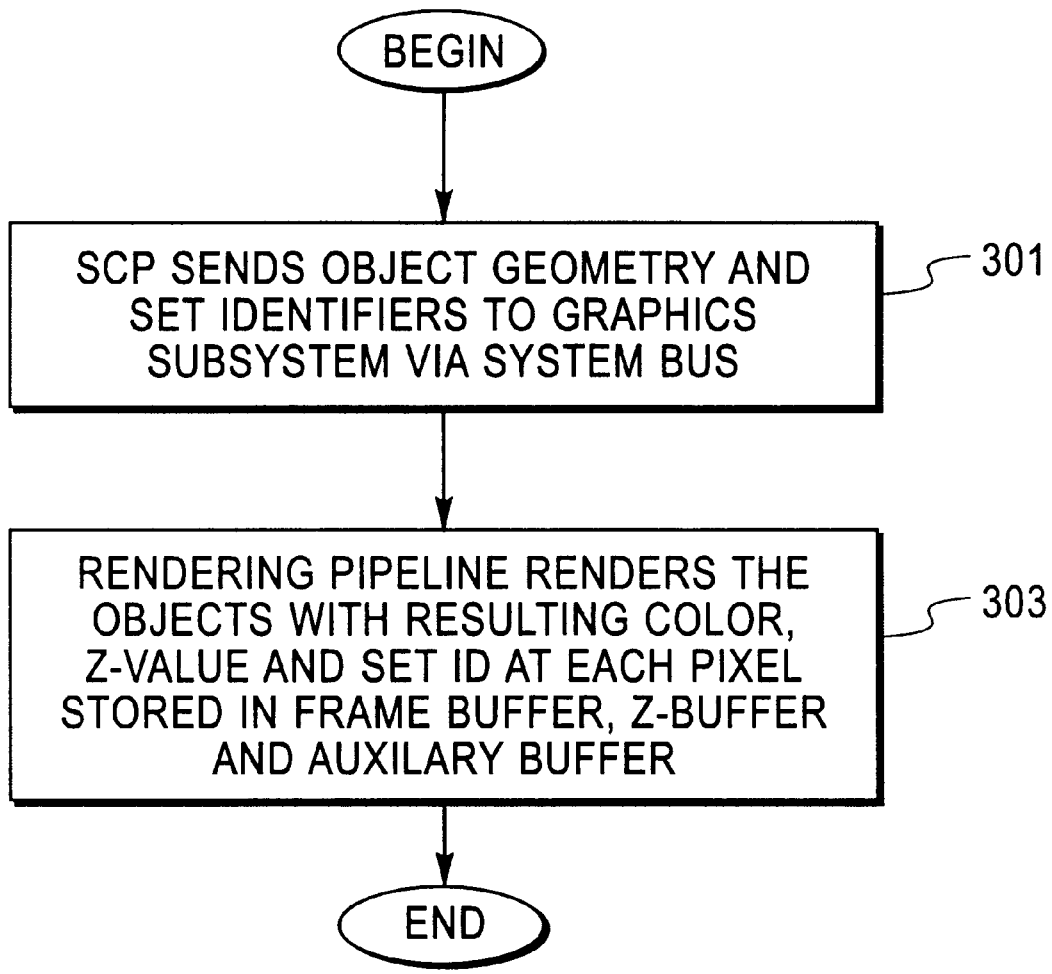
FIG. 5 is a flow chart illustrating the rendering operation performed by the graphics workstation of FIGS. 1 and 2 according to the present invention.

When rendering the scene, the set identifier of the object visible at a given pixel is stored in the auxiliary buffer 218 at an address corresponding to the given pixel. As shown in FIG. 5, in rendering the scene the following steps are executed. In step 301, the system control processor 102, under control of the application program, sends object geometry and the associated set identifiers from the system memory 104 to the graphics subsystem 110 via the system bus 106. Then, in step 303, upon receipt of the objects via the bus interface 204, the rendering pipeline of the graphics subsystem 110 transforms, clips and rasterizes the objects; the resulting pixel data (i.e. color, z-values and set identifiers) of the visible object at each pixel is stored by the memory controller 212 in the frame buffer 216, Z-buffer 214 and auxiliary buffer 218, respectively.

Figure 4:
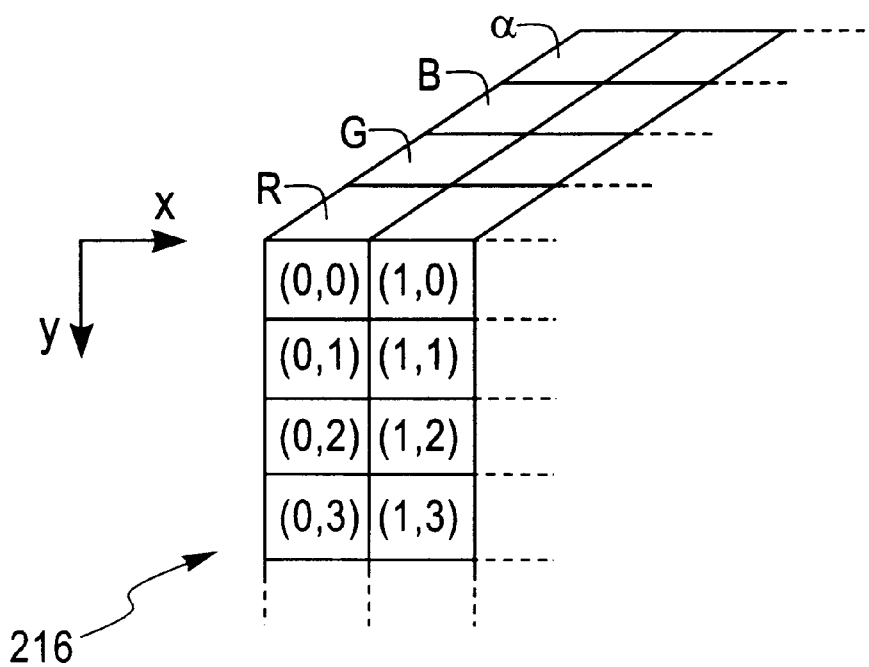
FIG. 4 is a pictorial representation of the integration of the auxiliary buffer into the frame buffer according to the present invention.

After all objects have been sent to the graphics subsystem 110 and the rendering operation is complete, the auxiliary buffer 218 contains at each pixel the set identifier of the object that is visible at that pixel. The auxiliary buffer 218 may be a separate device from the frame buffer 216. In the alternative, the auxiliary buffer 218 may be integrated into the frame buffer 216. For example, as shown in FIG. 4, the n bits of each pixel stored in the frame buffer 216 may be divided into two portions. A first portion contains the R,G,B color values of the visible object at the pixel and a second portion α, described above as the auxiliary buffer 218, contains the set identifier of the visible object at the pixel. In addition, some current graphics systems 100 already include a frame buffer 216 with the second portion a as shown in FIG. 4 to provide the capability of storing supplemental information such as transparency or the percentage by which a given primitive actually covers a given pixel. In these systems, the second portion a may be used to store the set identifier of the visible object at each pixel as described above.

Figure 6A:
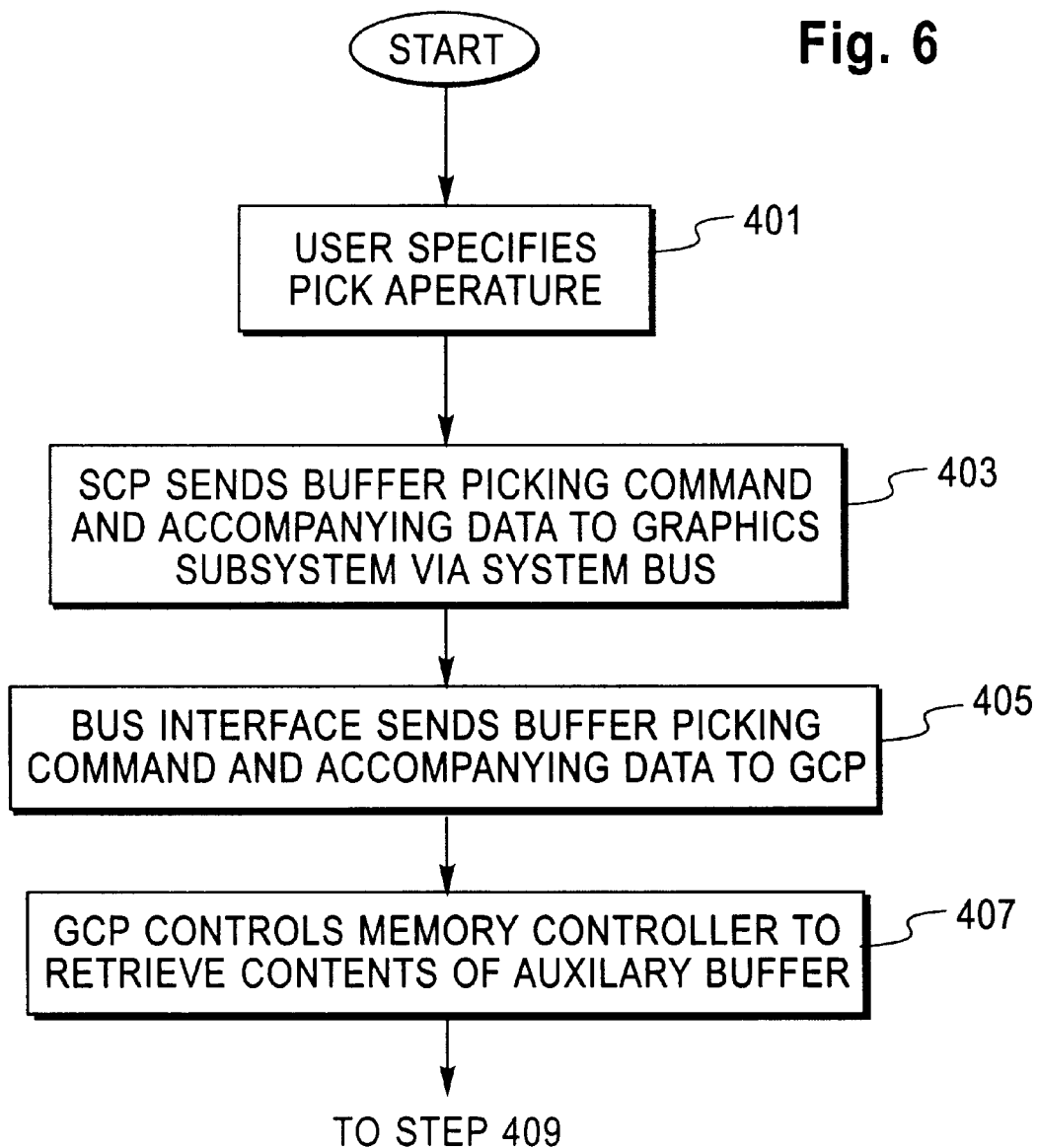
FIGS. 6A and 6B are flow charts illustrating the initial operation of the graphics workstation of FIGS. 1 and 2 in performing a picking function according to the present invention.
Figure 6B:
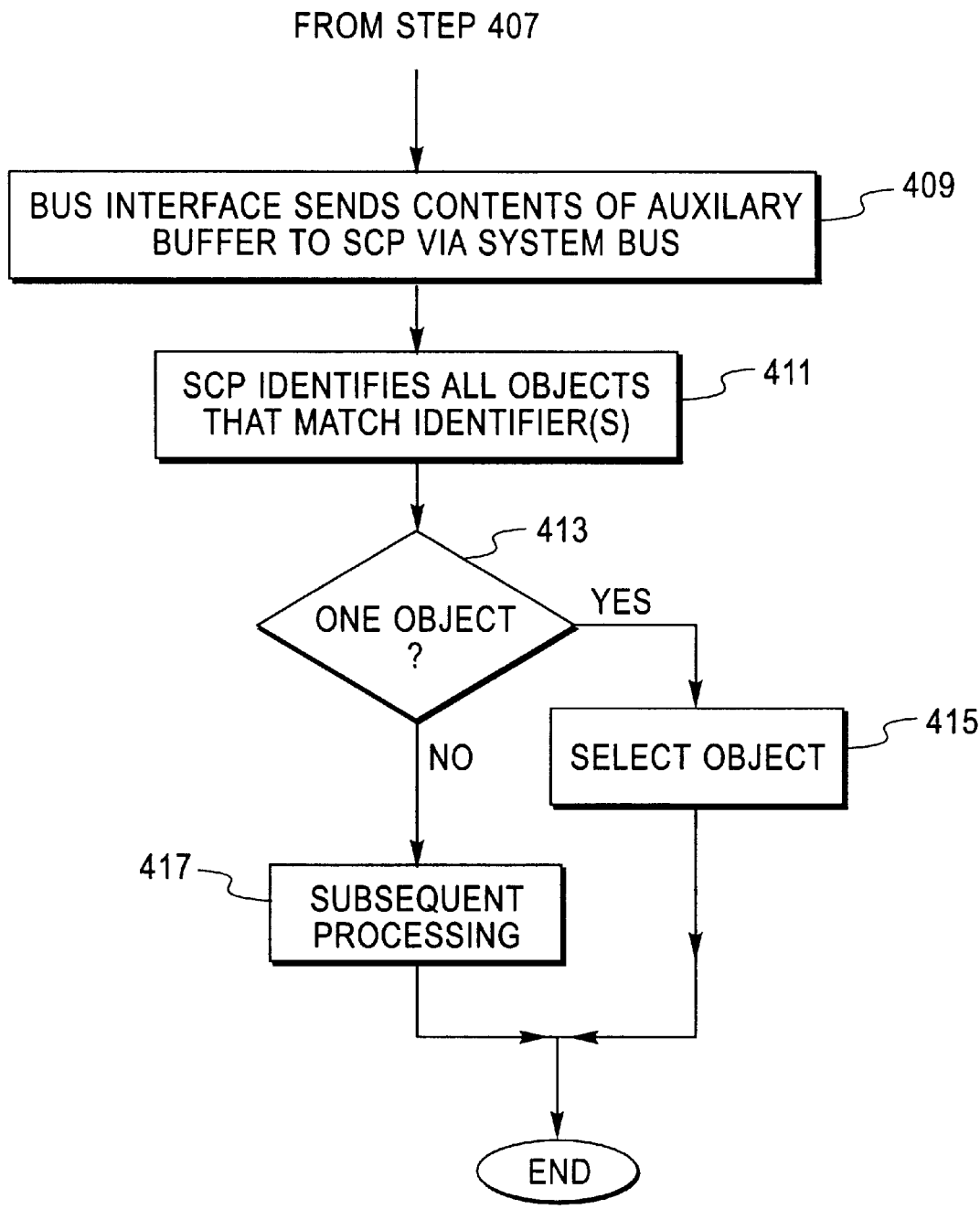

As shown in FIGS. 6A and 6B, the system control processor 102 and the graphics subsystem 110 operate as follows in processing a pick command input by the user. In step 401, as is conventional, the user invokes a pick function by specifying a picking aperture with I/O device 108. The picking aperture may be the coordinate of a single pixel or coordinates that represent a plurality of pixels. For example, the picking aperture may be a square of 16 by 16 pixels. In step 403, the system control processor 102 sends a "buffer picking" command and data defining the picking aperture to the graphics subsystem 110 via the system bus 106. The bus interface 204 in step 405 transfers the "buffer picking" command and accompanying data to the graphics control processor 200.

In step 407, after the rendering operation of the current scene has been completed, the graphics control processor 200 issues a command to the memory controller unit 212 via the control bus 202 to retrieve the contents of the auxiliary buffer for the picked pixel location(s) and to place the contents onto the feedback bus 222. The bus interface 204 in step 409 sends the contents of the auxiliary buffer 218 to the system control processor 102 over the system bus 106.

In step 411, the application program executed by the system control processor 102 identifies all objects whose set identifier matches the identifier(s) sent from the memory controller unit 212. In step 413, for each set identifier sent from the memory controller unit 212, the system control processor 102 determines if there is only one object that matches the set identifier. If in step 413 it is determined there is only one object that matches the set identifier, flow continues to step 415 wherein the application program selects that one object and communicates the selection to the user. However, if in step 413 it is determined there is more than one object with that same set identifier, flow proceeds to step 417 for subsequent processing.

Figure 7A:
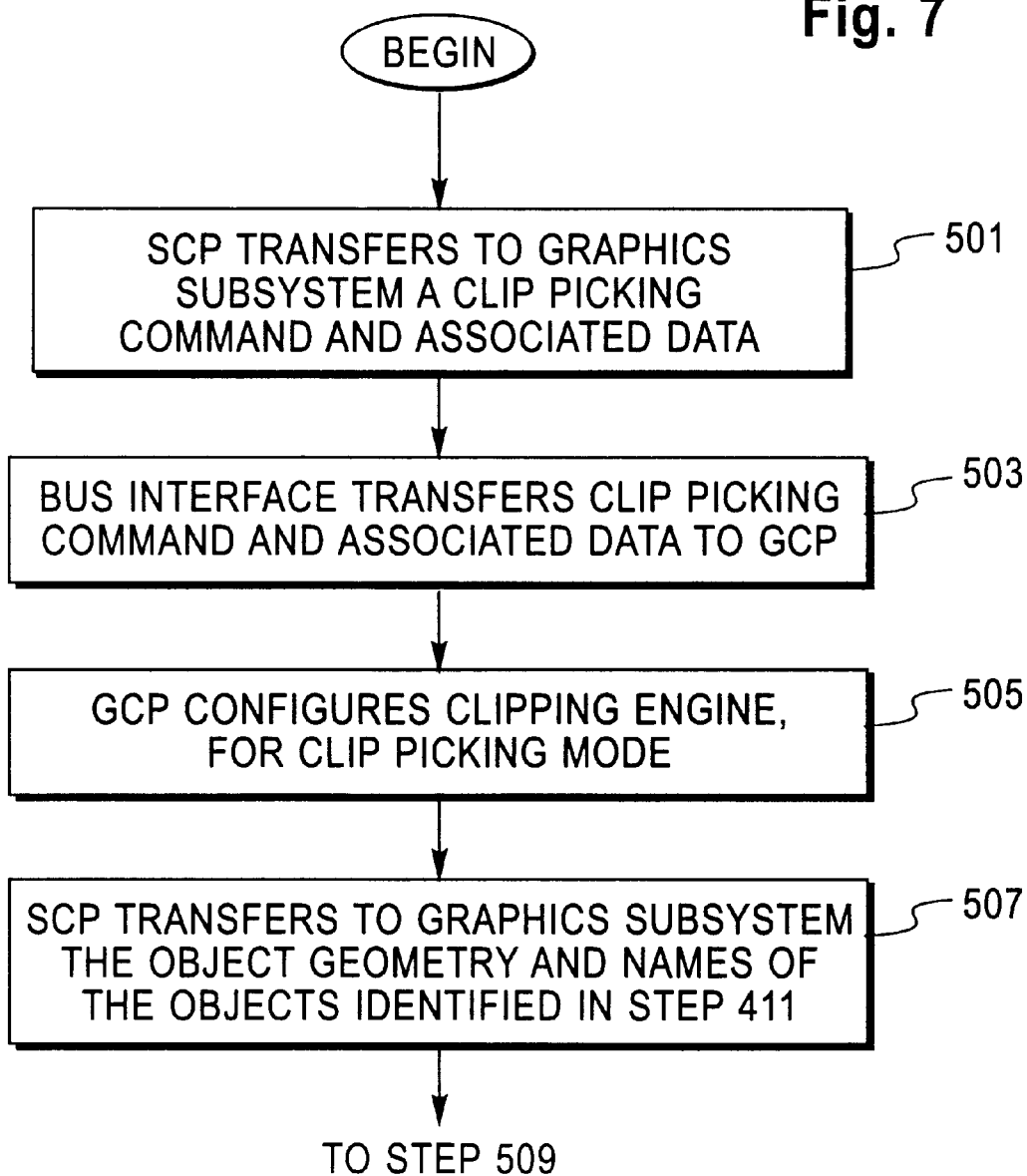
FIGS. 7A and 7B are flow charts illustrate the operation of the graphics workstation in performing the picking function subsequent to the steps of FIGS. 6A and 6B according to a first embodiment of the present invention.
Figure 7B:
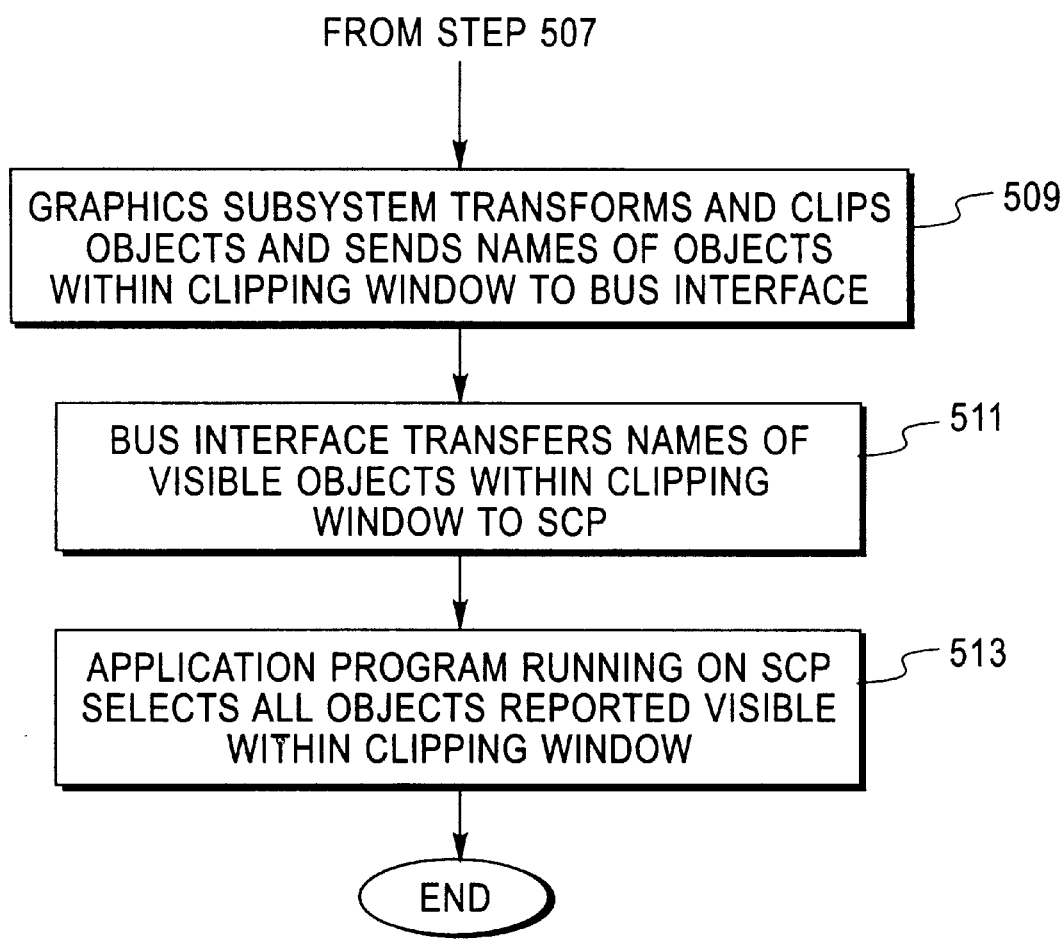

According to a first embodiment of the present invention, as shown in FIGS. 7A and 7B, the subsequent processing of step 417 operates as follows. In step 501, under control of the application program, the system control processor 102 issues a "clip picking" command to the graphics subsystem 110 and transfers to the graphics subsystem 110 data defining a clipping window that encloses the picking aperture. The bus interface 204 in step 503 transfers the "clip picking" command and associated data to the graphics control processor 200. In step 505, upon receiving the "clip picking" command, the graphics control processor 200 configures the clipping engine 208 to work in "clip picking" mode. In particular, coordinates of a clipping window that encloses the picking aperture is transferred to the clipping engine 208 via the control bus 202. The graphics control processor 200 then configures the clipping engine 208 to return the names of those objects that are visible within that clipping window to the bus interface 204 via the return bus 220. The graphics control processor 200 also disables the transfer of clipped vertex information from the clipping engine 208 to the rasterizer 210.

In step 507, under control of the program application, the system control processor 102 transfers to the graphics subsystem 110 via system bus 106 object geometries and names of those objects identified in step 411. In step 509, the graphics subsystem 110 receives the geometric information and object names via the system bus 106, then transforms and clips those objects identified by the object names. As set up in step 505, the clipping engine 208 transfers the names of objects that were visible in the clipping window to the bus interface 204 via the return bus 220. In step 511, the bus interface 204 transfers the names of the object visible in the clipping window to the system control processor 102 via the system bus 106. Finally, in step 513, the application program executing on the system control processor 102 selects all objects visible within the clipping window as reported from the bus interface 202, and communicates the selection(s) to the user.

Figure 8A:
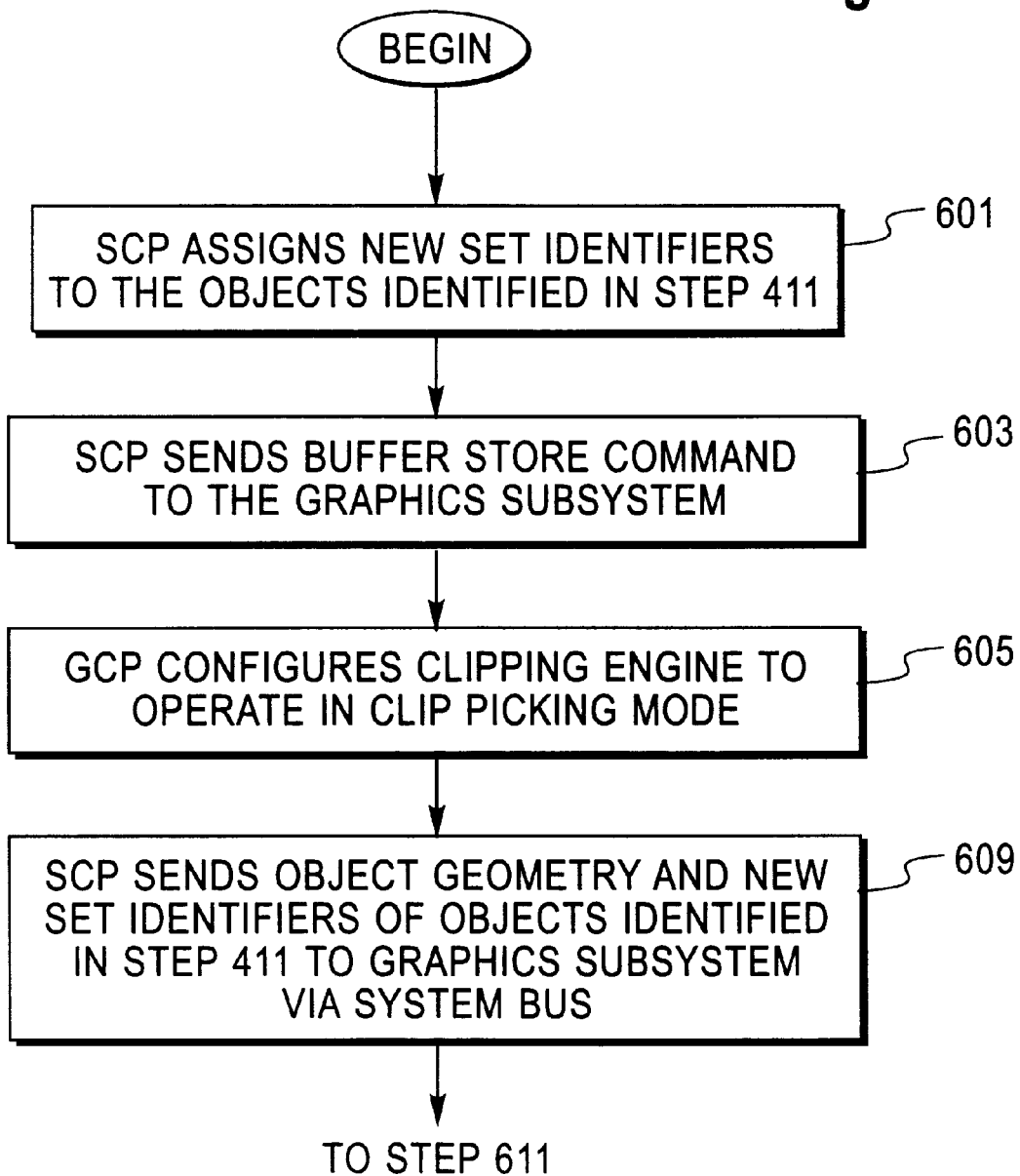
FIGS. 8A and 8B are flow charts illustrate the operation of the graphics workstation in performing the picking function subsequent to the steps of FIGS. 6A and 6B according to a second embodiment of the present invention.
Figure 8B:
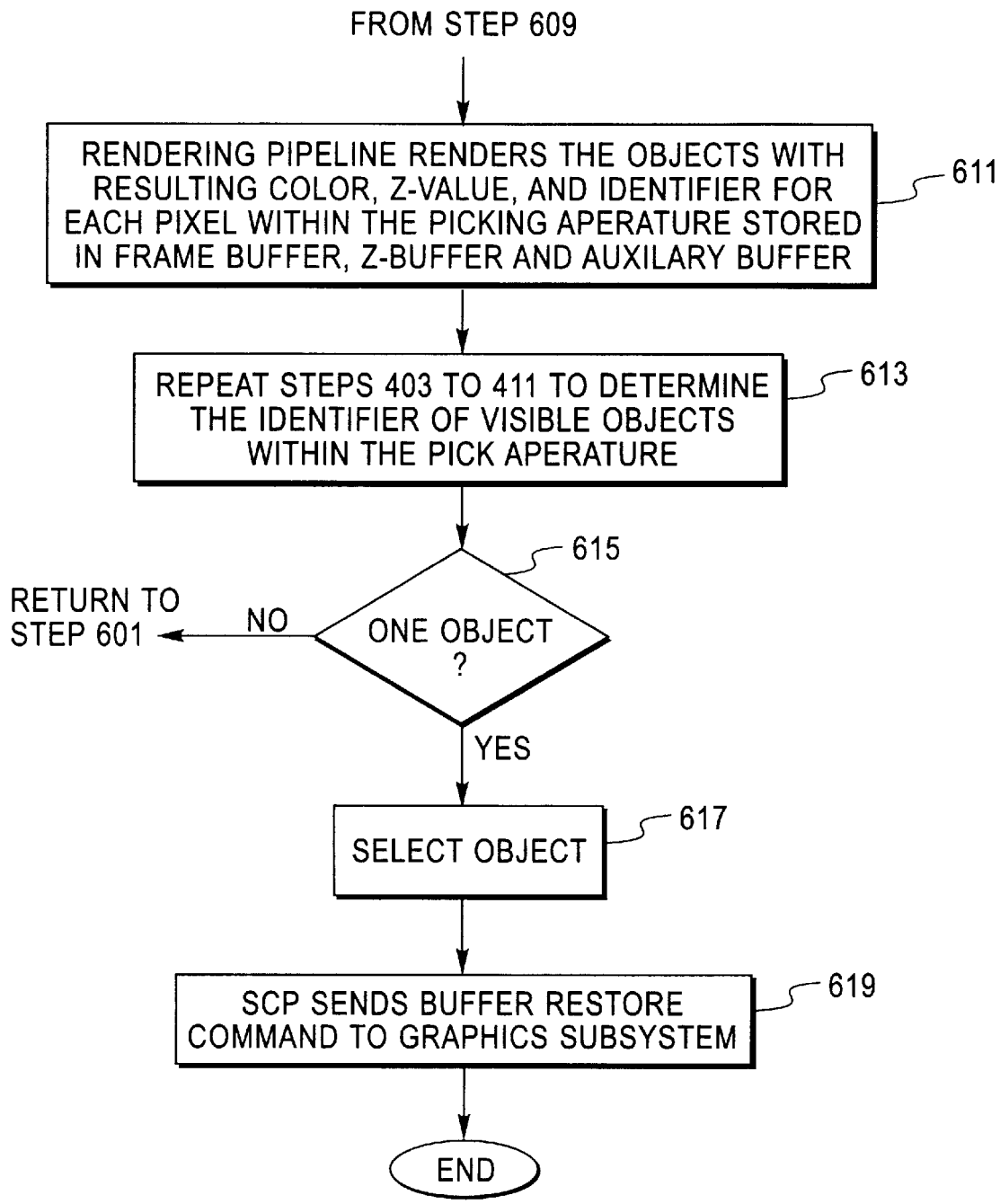

According to a second embodiment of the present invention, as shown in FIGS. 8A and 8B, the subsequent processing of step 417 operates as follows. In step 601, the system control processor 102 assigns new set identifiers to the objects identified in step 411. Preferably, a unique set identifier is assigned to each object. However, this may not be the case if the number of bits per pixel available in an auxiliary buffer 218 is not sufficient to uniquely identify all the objects identified in step 411. Then in step 603, the system control processor 102 sends a buffer store command to the graphics subsystem 110. Upon receipt, the graphics subsystem 110 transfers the contents of the frame buffer 214, Z-buffer 216, and auxiliary buffer 218 at addresses corresponding to at least the pixels of the picking aperture specified in step 401 to a temporary memory (not shown), or to a designated region in system memory 104. The transfer may be accomplished in any suitable manner, such as by a Bit Block Transfer operation, which is well known in the art. Then, in step 605, the graphics control processor 200 configures the clipping engine 208 to work in "normal clipping" mode. In particular, coordinates of a clipping window that encloses the picking aperture is transferred to the clipping engine 208 via the control bus 202. The graphics control processor 200 also configures the clipping engine 208 to transfer the clipped vertex information from the clipping engine 208 to the rasterizer 210. In addition, the color computations performed by the rasterizer 210 and the associated data transfer of color values performed by the memory controller 212 may be disabled.

In step 609, the system control processor sends the object geometry and new set identifiers of the objects identified in step 411 to the graphics subsystem 110 for rendering via the system bus 106. Then, in step 611, upon receipt of the objects via the bus interface 204, the rendering pipeline of the graphics subsystem 110 transforms, clips and rasterizes the objects; the resulting pixel data (i.e. color, z-values and set identifiers) of the visible object at each pixel is stored by the memory controller 212 in the frame buffer 216, Z-buffer 214 and auxiliary buffer 218, respectively. In addition, in step 611, the graphics control processor 200 may disable the color computations performed by the rasterizer 210 and the associated data transfer of color values to the frame buffer 216 performed by the memory controller 212. Then in step 613, the steps 403 to 411 as described above are repeated to determine the identifier of the visible object(s) within the picking aperture.

In step 615, for each identifier sent from the memory controller unit 212, the system control processor 102 determines if there is only one object that matches the identifier. If in step 615 it is determined there is only one object that matches the identifier, flow continues to step 617 wherein the application program selects that one object and communicates the selection to the user. However, if in step 615 it is determined there is more than one object with that same identifier, flow returns back to step 601 to repeat the processing operation of steps 601 to 615 for those objects determined to share the same identifier until a single object is identified.

In step 619, the system control processor 102 sends a buffer restore command to the graphics subsystem 110 via the system bus 106. Upon receipt, the graphics subsystem 110 restores the contents of the frame buffer 214, Z-buffer 216, and auxiliary buffer 218 with the data stored in the temporary memory in step 603, and the picking operation ends;

By grouping the objects into sets, storing the set identifier of the visible object for each pixel in the auxiliary buffer during rendering, and utilizing the information stored in the auxiliary buffer during picking, the picking operation of the present invention is an improvement over the conventional picking techniques because the present invention avoids the intensive task of traversing all of the objects of the scene to determine those objects intersected by the picking aperture.

Moreover, the auxiliary buffer that stores the set identification information may be integrated into a portion of the frame buffer that exists in current graphics workstations, but is not being utilized. Thus, advantageously, the present invention can be incorporated in the current architecture of graphics workstations with ease.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

We claim:

1. In a graphics system wherein a rendering mode is performed whereby a set of objects defining a three dimensional scene are rendered for display as an array of pixels in a display area of a display device, and wherein a picking mode is performed whereby a picking aperture within said display area is defined, a method for identifying one or more objects that are visible within said picking aperture, the method comprising the steps of:

during said rendering mode, assigning an identifier to each object of said set of objects, determining which particular object of said set of objects defining said scene is visible for a given pixel of said display device, storing color of the particular object for the given pixel in a frame buffer, and storing the identifier assigned to the particular object for the given pixel in an auxiliary buffer; and during said picking mode, for each pixel associated with said picking aperture, reading the identifier stored in the auxiliary buffer for the pixel to thereby identify one or more objects visible in said picking aperture as a picked object.

2. The method of claim 1, wherein said identifier assigned to each object is unique to each object.

3. The method of claim 1, wherein said identifier assigned to each object is a group identifier that is shared by two or more objects.

4. The method of claim 1, said system further comprising a frame buffer having n bits per pixel, wherein said n bits are divided into a first portion and a second portion, wherein in normal operation mode a color value of the particular object determined to be visible at the given pixel is stored in said first portion of said frame buffer at an address corresponding to the given pixel, and said auxiliary buffer corresponds to said second portion of said frame buffer.

5. The method of claim 1, further comprising the step of:
in said picking mode, for particular identifiers read from said auxiliary buffer that are assigned to only one object, identifying said one object as a picked object.

6. The method of claim 1, further comprising the steps of:
in said picking mode, for particular identifiers read from said auxiliary buffer that are assigned to more than one object, (a) defining a clipping window that corresponds to said picking aperture;
(b) clipping the objects assigned to said particular identifiers against said clipping window to determine those objects assigned to said particular identifiers that are within said clipping window; and
(c) identifying each object determined to be within said clipping window as a picked object.

7. The method of claim 1, further comprising the steps of:

in said picking mode, for particular identifiers read from said auxiliary buffer that are assigned to more than one object,
  (a) assigning new identifiers to objects that share said particular identifiers;
  (b) determining which object of the objects that share said particular identifiers is visible for a given pixel of said display device, and storing the new identifier assigned to the object in said auxiliary buffer at an address corresponding to the given pixel; and
  (c) for each pixel associated with said picking aperture, reading the new identifier stored in the auxiliary buffer at an address corresponding to the pixel.

8. The method of claim 7, further comprising the step of:
in said picking mode, for particular new identifiers read from said auxiliary buffer that are assigned to only one object, identifying said one object as a picked object.

9. The method of claim 7, further comprising the step of:
in said picking rode, if particular new identifiers read from said auxiliary buffer are shared by more than one object, repeating the steps of claim 7 until all identifiers read from said auxiliary buffer are assigned to only one object.

\* \* \* \* \*